(12) United States Patent
Corl

(10) Patent No.: US 7,428,745 B2
(45) Date of Patent: *Sep. 23, 2008

(54) DIFFERENTIATED PSIP TABLE UPDATE INTERVAL TECHNOLOGY

(75) Inventor: Mark T. Corl, Princeton Junction, NJ (US)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/075,944

(22) Filed: Mar. 10, 2005

(65) Prior Publication Data

US 2005/0183125 A1    Aug. 18, 2005

Related U.S. Application Data

(63) Continuation of application No. 09/828,865, filed on Apr. 10, 2001.

(60) Provisional application No. 60/197,677, filed on Apr. 17, 2000.

(51) Int. Cl.
G06F 3/00 (2006.01)
G06F 13/00 (2006.01)
H04N 5/445 (2006.01)

(52) U.S. Cl. .......................................... 725/54; 725/50

(58) Field of Classification Search .................. 725/39, 725/50, 54
See application file for complete search history.

(56) References Cited

U.S. PATENT DOCUMENTS 5,077,828 A * 12/1991 Waldroup .................... 455/514
6,137,549 A * 10/2000 Rasson et al. ................. 725/37
6,314,571 B1 * 11/2001 Ogawa et al. ................. 725/48
6,505,347 B1 * 1/2003 Kaneko et al. ................ 725/39
6,658,661 B1 * 12/2003 Arsenault et al. ............. 725/54

OTHER PUBLICATIONS

Program Guide for Digital Television ATSC Standard Doc. A/55, Jan. 3, 1996.*
Program and System Information Protocol for Terrestrial Broadcast and Cable, ATSC Soc. A/65, Dec. 23, 1997.*

* cited by examiner

Primary Examiner—John W. Miller
Assistant Examiner—Dominic Saltarelli
(74) Attorney, Agent, or Firm—McKenna Long & Aldridge, LLP

(57) ABSTRACT

An apparatus for inserting a plurality of event information tables (EITs) and a plurality of extended text tables (ETTs) into the data stream in a broadcast environment, the apparatus including a generator to set a first transmission interval for a group of EIT0s containing program information covering a first broadcast time, and a second tranmission interval for a group of EIT1s containing program information covering a second broadcast time after the first broadcast time, and to generate the group of EIT0s and the group of EIT1s. The first transmission interval for the group of EIT0s is set narrower than the second transmission interval for the group of EIT1s. The generator is further configured to set a transmission interval for a group of EIT3s containing program description associated with a group of EIT3s, and where the generator sets the transmission interval of the group of ETT3s to be greater than a sum of the first transmission interval for the group of EIT0s and the second transmission interval for the group of EIT1s.

28 Claims, 2 Drawing Sheets

DIFFERENTIATED PSIP TABLE UPDATE INTERVAL TECHNOLOGY

CONTINUITY DATA

The present application is a continuation of co-pending application Ser. No. 09/828,865 filed on Apr. 10, 2001, and for which priority is claimed under 35 U.S.C. § 120, the entire contents of which are hereby incorporated by reference. The present application also claims priority upon U.S. Provisional Patent Application, Ser. No. 60/197,677, filed Apr. 17, 2000, the entirety of which is hereby incorporated by reference.

FIELD OF THE INVENTION

The invention is directed toward the field of digital television signal meta data generation, and more particularly to the non-uniform issuance of certain tables included within such meta data.

BACKGROUND OF THE INVENTION

It is known for a digital television (DTV) signal to include meta data representing information about the contents of the events, e.g., programs, movies, sports games, etc. contained in the DTV signal. For a terrestrially broadcast DTV signal, the Advanced Television Standards Committee (ATSC) has promulgated the A/65 Standard that defines such meta data. The A/65 standard refers to such meta data as program and system information protocol (PSIP) data.

The PSIP type of meta data is issued periodically. Data of greater importance in the meta data hierarchy is inserted into the DTV signal more frequently than data of lower importance.

In general, in this art it is desired to maximize the amount of available bandwidth that can be allocated to the transmission of the DTV program content. Unfortunately, meta data consumes bandwidth that otherwise could be used to transmit the corresponding DTV program content. But such meta data is a prerequisite to an A/65 compliant DTV signal, hence it cannot be eliminated to recover bandwidth.

It is a problem to reconcile the contradictory design criteria of maximizing bandwidth allocated to DTV program content and providing sufficient meta data to ensure compliance with the A/65 standard.

SUMMARY OF THE INVENTION

The invention is, in part, a solution to the problem of how to insert the least amount possible of meta data into the DTV signal and yet still achieve an A/65 compliant DTV signal. In other words, the invention is, in part, a recognition that it is desirable to insert meta data into the DTV signal as infrequently as possible.

The invention is, also in part, a recognition that: the A/65 standard establishes fixed frequencies of table output for some of the program and system information protocol (PSIP) data tables, e.g., such as the Master Guide Table (MGT), the Virtual Channel Table (VCT) and the System Time Table (STT), but not for some others; and such unfixed output intervals afford opportunities to lessen meta data output thereby reducing bandwidth consumption in the form of PSIP meta data without sacrificing compliance with the A/65 standard.

The invention provides, in part, a method to determine issuance intervals for like types of tables, respectively, in a digital television packet stream having a plurality of different types of tables that do not have issuance intervals set by a governing standard. Such a method comprises: setting issuance intervals for like ones of the non-governed tables, respectively, to be non-uniform. Such non-uniform issuance intervals can be determined as a function of at least one of an amount of time in the future to which the table corresponds and a degree of probable interest to a viewer. Further, such non-uniform issuance intervals can be weighted so that an issuance interval for a table corresponding to a time nearer the present is smaller than an issuance interval corresponding to a time further in the future.

According to an aspect of the invention, an apparatus for inserting a plurality of event information tables (EITs) and a plurality of extended text tables (ETTs) into the data stream in a broadcast environment, the apparatus including a generator to set a first transmission interval for a group of EIT0s containing program information covering a first broadcast time, and a second transmission interval for a group of EIT1s containing program information covering a second broadcast time after the first broadcast time, and to generate the group of EIT0s and the group of EIT1s, where the first transmission interval for the group of EIT0s is set narrower than the second transmission interval for the group of EIT1s, where the generator is further configured to set a transmission interval for a group of ETT3s containing program description associated with a group of EIT3s, and where the generator sets the transmission interval of the group of ETT3s to be greater than a sum of the first transmission interval for the group of EIT0s and the second transmission interval for the group of EIT1s.

The invention, also in part, provides a processor-readable article of manufacture having embodied thereon software comprising a plurality of code segments to cause a processor to perform the method according to the invention.

According to an aspect of the invention, there is provided an apparatus for generating at least one table in a broadcast environment, the apparatus comprising: a generator to set a first transmission interval for a first group of tables, and a second transmission interval for a second group of tables; and to generate the first and second groups of tables, each group including program information, wherein the first group of tables are inserted into a bit stream more frequently than the second group of tables based on the first and second transmission intervals.

According to an aspect of the invention, there is provided a method for generating at least one table in a broadcast environment, the method comprising: setting a first transmission interval for a first group of tables, and a second transmission interval for a second group of tables; generating the first and second groups of tables, each group including program information; and inserting the first and second groups of tables into a bit stream, wherein the first group of tables are inserted into the bit stream more frequently than the second group of tables based on the first and second transmission intervals.

According to an aspect of the invention, there is provided a data structure for generating at least one table in a broadcast environment, the structure comprising: a first group of tables having a first transmission interval and program information; and a second group of tables having a second transmission interval and program information, wherein the first group of tables are inserted into a bit stream more frequently than the second group of tables based on the first and second transmission intervals.

According to an aspect of the invention, there is provided an apparatus for generating at least one table in a broadcast environment, the apparatus comprising: a generator to receive and set a first transmission cycle time for a first table, and a second transmission cycle time for a group of second tables;

and to generate the first and second tables each carrying program information, wherein the first table is inserted into a bit stream more frequently than any one of the second tables based on the first and second transmission cycle times.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus do not limit the present invention.

DETAILED DESCRIPTION OF THE PREFERRED EMBODIMENTS

Figure 1:
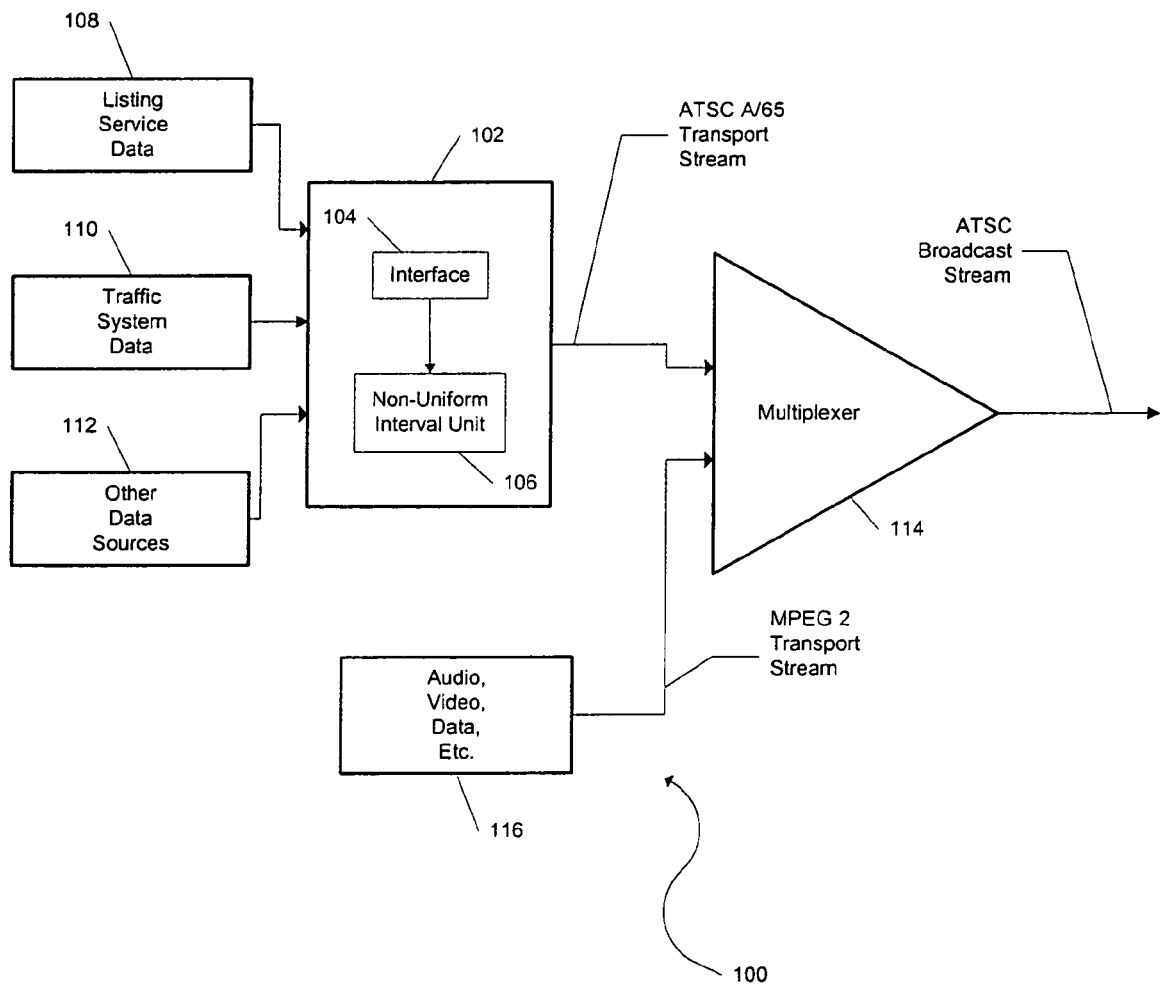
FIG. 1 is a block diagram of a PSIP generator according to the invention in the context of typical inputs to it and outputs from it.

FIG. 1 is a block diagram of a program and system information protocol (PSIP) data generator according to the invention in the context of system 100 that can produce an Advanced Television Standards Committee (ATSC), standard A/65, compliant digital television (DTV) signal. The system 100 of FIG. 1 includes: a PSIP generator 102 according to the invention; sources of data upon which the PSIP generator operates, such as a source 108 of listing service data, a source 110 of traffic system data and a source 112 of other data; a multiplexer 114 to incorporate the PSIP data from the PSIP generator 102 into an A/65-compliant DTV signal; and a source 116 of audio data, video data, etc.

In FIG. 1, the PSIP generator 102 includes an interface unit 104 and a non-uniform interval calculation unit 106.

The PSIP generator 102 according to the invention can be implemented by adapting a well known PSIP generator according to the discussion herein. An example of a known PSIP generator is the PSIP BUILDER PRO brand of PSIP generator manufactured and sold by TRIVENI DIGITAL INC. The PSIP BUILDER PRO itself is based upon a programmed PC having a Pentium type of processor using the MICROSOFT WINDOWS NT4.0 operating system. The software can be written in the Java language. The other blocks of FIG. 1 correspond to known technology.

In FIG. 1, the invention has been depicted in the context of a digital television broadcast such as a terrestrial broadcast, and more particularly one that is compliant with the Advanced Television Standards Committee (ATSC), where each event is a program, and the schedule data is PSIP data. However, the invention is readily applicable to any television format, e.g., analog terrestrial, analog cable, digital cable, satellite, etc., for which an electronic schedule is maintained and corresponding data is sent to a receiver for the purpose of presenting an electronic program guide (EPG) to a viewer.

The units 104 and 106 within the PSIP generator 102 do not necessarily correspond to discrete hardware units. Rather, the units 102 and 104 can represent functional units corresponding to program segments of the software that can embody the invention.

The interface unit 104 can generate a graphical user interface (GUI) that operates to receive at least one issuance parameter for like PSIP tables (e.g., ETTs or EITs) that do not all have an issue interval assigned by the A/65 standard. Such an interface will be described in more detail below with regard to FIG. 2. The non-uniform interval calculation unit 106 is operable to determine non-uniform issuance intervals for ones of the like PSIP tables that do not have an assigned interval, based upon the issuance parameter(s) received via the interface unit 104.

Figure 2:
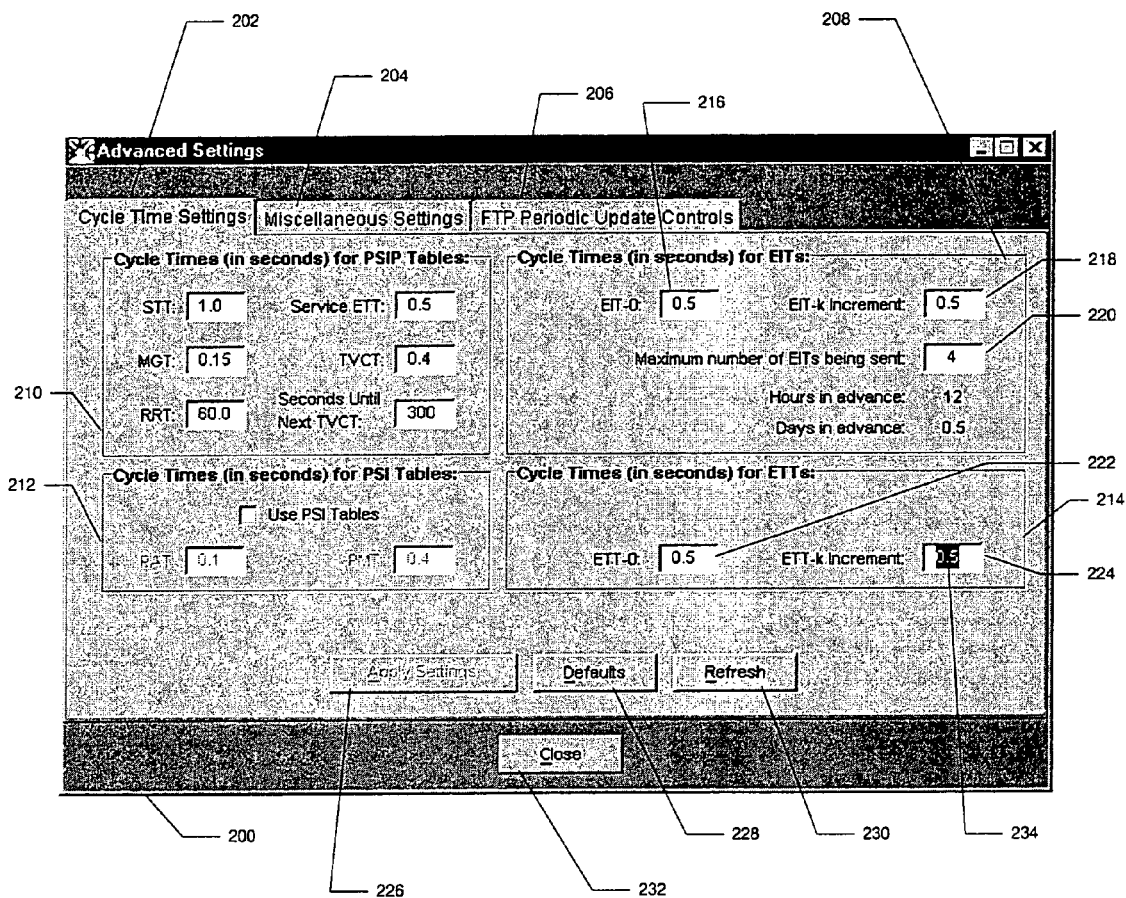
FIG. 2 is an image of a dialog window within a screen of a graphical user interface (GUI) generated by the PSIP data generator according to the invention.

FIG. 2 is an example image of a dialog window 200 (a GUI) that can be generated by the interface unit 104 according to the invention. In FIG. 2, the dialog window 200 can include: a Cycle Time Settings tab 202; a Miscellaneous Settings tab 204; a FTP Periodic Update Controls tab 206; an "Apply Settings" button 226; a "Defaults" button 228; a "Refresh" button 230; and a "Close" button 232. The position of the cursor can be indicated via the reverse highlighting 234. The Cycle Time Settings tab 202 can include a "Cycle Times (in seconds) for EITs:" region 208, a "Cycle Times (in seconds) for PSIP Tables:" region 210, a "Cycle Times (in seconds) for PSI Tables:" region 212 and a "Cycle Times (in seconds) for ETTs:" region 214.

It is well known that EITs carry program schedule information including program title information and program start information. Each EIT covers a three-hour time span. ETTs carry text messages associated with the EITs, e.g., program description information for an EIT.

In FIG. 2, the "Cycle Times (in seconds) for EITs:" region 208 of the dialog window 200 can include: a box 216 in which a user can enter a fixed interval for the $EIT_0$ table; a box 218 in which a user can enter an increment for the $EIT_k$ table; and a box 220 in which a user can enter a maximum number of EIT tables that are to be sent. Usually, the number entered in box 220 will be far smaller than the maximum number of EIT tables permitted by the A/65 standard.

Also, in FIG. 2, the "Cycle Times (in seconds) for ETTs:" region 214 can include: a box 222 in which a user can enter a fixed interval for the $ETT_0$ table; and a box 224 in which a user can enter an increment for the $ETT_k$ table.

The non-uniform interval calculation unit 106 can receive the values in the boxes 216, 218, 220, 222 and 224 from the regions 208 and 214, respectively, and use them to determine the non-uniform issuance intervals of, e.g., the EIT and ETT tables. Further discussion of the operation of the unit 106 is couched in a particular non-limiting example, for simplicity.

The A/65 standard recommends a time interval for outputting the zeroith Event Information Table (EIT), i.e., $EIT_0$, but provides no guidelines regarding $EIT_1$ through $EIT_{128}$. For the Rating Region Table (RRT), the A/65 standard recommends a value only for the output frequency of RRT. And no recommendation is made regarding the output frequencies of any of the Extended Text Tables (ETTs).

Under the A/65 standard, it is left to the discretion of the operator of a PSIP data generation system to select the frequency of table output for the unmentioned tables. The operator could specify an entry for each group of tables, but that would be burdensome because it would require a total of over 500 entries. A simple solution to the problem of unspecified output frequencies would be to set each type of table to the same output frequency, but that creates a problem in that the guidelines for bandwidth specified by the A/65 standard would be exceeded.

A further consideration to solve the problem, namely of how to insert the least amount possible of meta data into the DTV signal and yet still achieve an A/65 compliant DTV signal, is: How closely in time to the present moment does each table relate? That is, table types such as the EIT describe event information up to two weeks into the future. A user of an electronic program guide that receives such table types will typically want to view event information concerning only the next 24-48 hours. Users typically do not look farther into the future than this because (at least in part) the event schedule information two weeks into the future is much more likely to change than is event schedule information concerning the next 24-48 hours, i.e., the farther into the future, the less reliable the event information becomes.

Care must be exercised so as not to set the intervals to be too infrequent. This is because the DTV receiver can become stalled waiting for a table to arrive. If the DTV receiver is stalled for 0.5 seconds, a user might not notice or object if she did. But such a delay of, e.g., 4-5 seconds probably would be noticed by, and probably would annoy, the user. This reinforces the need to set short intervals for near term events because users are likely to want to display EPG information about them.

Again, the invention, in part, provides an interface unit 104 that defines parameters that the non-uniform interval calculation unit 106 then can use to generate the time intervals between tables of the same type. Typically (but not necessarily) the function performed by the unit 106 will be linear, e.g., with a defined start interval (the root_time) and an increment interval (increment_time). For example, if the user desires $EIT_0$ to be output every half second (root_time) with each succeeding $EIT_i$ to be output 0.25 seconds less frequently than the preceding EIT, namely $EIT_{i-1}$, the user would enter 0.5 seconds as the root_time in box 216 and 0.25 seconds as the increment_time in box 218. The function for each table EIT-i interval would then be:

$$\begin{aligned}\text{Time between any two instances of table}_i &= \text{root\_time} + (\text{increment\_time} * i) \\ &= 0.5 \text{ sec} + (0.25 \text{ sec} * i)\end{aligned}$$

For example, $EIT_{12}$ can be output every 0.5 sec+(0.25 sec *12)=3.5 seconds, which is less frequent than $EIT_0$. Obviously, other examples are possible, e.g., the increment_time for each of different groups of like tables can be set.

A similar calculation for ETTs can be performed by the unit 106.

The invention has at least the following advantages: 1) it provides an easy way of entering the interval times for the tables: 2) it defines the interval times for like tables that are not all fixed to a constant interval; and 3) it provides an interval function that increases the interval for tables that represent information further out in time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. An apparatus for inserting a plurality of event information tables (EITs) and a plurality of extended text tables (ETTs) into the data stream in a broadcast environment, the apparatus comprising:
   a generator to set a first transmission interval for a group of EIT0s containing program information covering a first broadcast time, and a second transmission interval for a group of EIT1s containing program information covering a second broadcast time after the first broadcast time, and to generate the group of EIT0s and the group of EIT1s, wherein the first transmission interval for the group of EIT0s is set narrower than the second transmission interval for the group of EIT1s
   wherein the generator is further configured to set a transmission interval for a group of EIT3s containing program description associated with a group of EIT3s,
   wherein the generator sets the transmission interval of the group of ETT3s to be greater than a sum of the first transmission interval for the group of EIT0s and the second transmission interval for the group of EIT1s.

2. The apparatus of claim 1, wherein the first transmission interval specifies a time interval between transmissions of any two adjacent EIT0s in the group of EIT0s.

3. The apparatus of claim 2, wherein the second transmission interval specifies a time interval between transmissions of any two adjacent EIT1s in the group of EIT1s.

4. The apparatus of claim 1, wherein the data stream is a digital TV broadcast stream.

5. The apparatus of claim 1, wherein the program information includes program guide information having at least program time information and program start time information.

6. A method for inserting a plurality of event information tables (EITs) and a plurality of extended text tables (ETTs) into the data stream in a broadcast environment, the method comprising:
   setting a first transmission interval for a group of EIT0s containing program information covering a first broadcast time, and a second transmission interval for a group of EIT1s containing program information covering a second broadcast time after the first broadcast time, wherein the first transmission interval for the group of EIT0s is set narrower than the second transmission interval for the group of EIT1s;
   setting a transmission interval for a group of extended text tables ETT3s containing program description associated with a group of EIT3s, wherein the transmission interval for the group of ETT3s is greater than the sum of the first transmission interval for the group of EIT0s and the second transmission interval for the group of EIT1s;
   generating the group of EIT0s and the group of EIT1s; and
   generating the group of ETT3s.

7. The method of claim 6, wherein the first transmission interval specifies a time interval between transmissions of any two adjacent EIT0s in the group of EIT0s.

8. The method of claim 7, wherein the second transmission interval specifies a time interval between transmissions of any two adjacent EIT1s in the second group of EIT1s.

9. The method of claim 6, wherein the data stream is a digital TV broadcast stream.

10. The method of claim 6, wherein the program information includes program guide information having at least time information and program start time information.

11. An apparatus for inserting a plurality of event information tables EITs) and a plurality of extended text tables (ETTs) into the data stream in a broadcast environment, the apparatus comprising:
    a generator to set a first transmission cycle time for a EIT0 containing program information covering a first broadcast time, and a second transmission cycle time for a EIT1 containing program information covering a second broadcast time after the first broadcast time, and to generate the EIT0s and the EIT1s, wherein the first transmission cycle time for the EIT0 is set narrower than the second transmission cycle time for the EIT1,
    wherein the generator is further configured to set a transmission cycle time for an ETT3 containing program description associated with EIT3;
    wherein the generator periodically inserts the EIT0 into the data stream more frequently than the EIT1 based on the first and second transmission cycle time, and wherein the generator periodically inserts the ETT3 into the data stream at the transmission cycle time that is greater than a sum of the first transmission cycle time for the EIT0 and the second transmission cycle time for the EIT1.

12. The apparatus of claim 1, wherein the generator sets the first and second transmission intervals based on the first and second broadcast time covered by the program information of the group of EIT0s and the group of EIT1s.

13. The method of claim 6, wherein in the setting step, the first and second transmission intervals are set based on the first and second broadcast time covered by the program information of the group of EIT0s and the group of EIT1s.

14. The apparatus of claim 11, wherein the generator sets the first and second transmission cycle time based on the first and second broadcast time covered by the program information of the EIT0 and the EIT1.

15. A method of operating a digital television (DTV) receiver that receives and processes a data stream in a broadcast environment, the method comprising:
receiving a series of EIT0s with a first transmission interval, the series of EIT0s containing program information covering a first broadcast time, and a series of EIT1s with a second transmission interval, the series of EIT1s containing program information covering a second broadcast time after the first broadcast time, wherein the first transmission interval for the series of EIT0s is set narrower than the second transmission interval for the series of EIT1s;
parsing for the series of EIT0s and the series of EIT1s;
receiving a series of extended text tables EIT3s containing program description associated with a series of EIT3s, wherein the transmission interval of the series of EIT3s is greater than a sum of the first transmission interval of the series of EIT0s and the second transmission interval of the series of EIT1s; and
parsing for the series of EIT3s.

16. The method of claim 15, wherein the data stream is a digital TV broadcast stream.

17. The method of claim 15, wherein the first transmission interval specifies a time interval between transmissions of any two adjacent EIT0s in the series of EIT0s.

18. The method of claim 17, wherein the second transmission interval specifies a time interval between transmissions of any two adjacent EIT1s in the series of EIT1s.

19. The method of claim 15, wherein the program information includes program guide information having at least program time information and program start time information.

20. The method of claim 15, wherein the first and second transmission intervals are set based on the first and second broadcast time covered by the program information of the series of EIT0s and the series of EIT1s.

21. A method of operating a digital television (DTV) receiver that receives and processes a data stream in a broadcast environment, the method comprising:
receiving a group of EIT0s with a first transmission interval, the group of EIT0s containing program information covering a first broadcast time;
parsing for the group of EIT0s;
receiving a group of EIT1s with a second transmission interval, the group of EIT1s containing program information covering a second broadcast time after the first broadcast time, wherein the first transmission interval for the group of EIT0s is set narrower than the second transmission interval for the group of EIT1s;
parsing for the group of EIT1s;
receiving a group of extended text tables EIT3s containing program description associated with a group of EIT3s, wherein the transmission interval of the group of ETT3s is greater than a sum of the first transmission interval of the group of EIT0s and the second transmission interval of the group of EIT1s; and
parsing for the group of EIT3s.

22. The method of claim 21, wherein the data stream is a digital TV broadcast stream.

23. The method of claim 21, wherein the first transmission interval specifies a time interval between transmissions of any two adjacent EIT0s in the group of EIT0s.

24. The method of claim 23, wherein the second transmission interval specifies a time interval between transmissions of any two adjacent EIT1s in the group of EIT1s.

25. The method of claim 21, wherein the program information includes program guide information having at least program time information and program start time information.

26. The method of claim 21, wherein the first and second transmission intervals are set based on the first broadcast time and second broadcast time covered by the program information of the group of EIT0s and the group of EIT1s.

27. A method of operating a digital television (DTV) receiver that receives and processes a data stream in a broadcast environment, the method comprising:
receiving packets of EIT0 with a first transmission interval, the packets of EIT0 containing program information covering a first broadcast time, and packets of EIT1 with a second transmission interval, the packets of EIT1 containing program information covering a second broadcast time after the first broadcast time, wherein the first transmission interval for the packets of EIT0s is set narrower than the second transmission interval for the packets of EIT1s;
parsing for the packets of EIT0 and the packets of EIT1;
receiving packets of extended text table ETT3 containing program description associated with EIT3, wherein the transmission interval of the packets of ETT3 is greater than a sum of the first transmission interval of the packets of EIT0 and the second transmission interval of the packets of EIT1; and
parsing for the packets of ETT3.

28. A method of operating a digital television (DTV) receiver that receives and processes a data stream in a broadcast environment, the method comprising:
receiving packets of EIT0 with a first transmission interval, the packets of EIT0 containing program information covering a first broadcast time;
parsing for the packets of EIT0;
receiving packets of EIT1 with a second transmission interval, the packets of EIT1 containing program information covering a second broadcast time after the first broadcast time, wherein the first transmission interval for the packets of EIT0 is set narrower than the second transmission interval for the packets of EIT1;
parsing for the packets of EIT1;
receiving packets of extended text table ETT3 containing program description associated with EIT3, wherein the transmission interval of the packets of ETT3 is greater than a sum of the first transmission interval of the packets of EIT0 and the second transmission interval of the packets of EIT1; and
parsing for the packets of ETT3.

* * * * *

UNITED STATES PATENT AND TRADEMARK OFFICE
CERTIFICATE OF CORRECTION

| | | |
|---|---|---|
| PATENT NO. | : 7,428,745 B2 | |
| APPLICATION NO. | : 11/075944 | |
| DATED | : September 23, 2008 | |
| INVENTOR(S) | : Mark T. Corl | |

It is certified that error appears in the above-identified patent and that said Letters Patent is hereby corrected as shown below:

Col. 7, claim 15. should read --A method of operating a digital television (DTV) receiver that receives and processes a data stream in a broadcast environment, the method comprising:

receiving a series of EIT0s with a first transmission interval, the series of EIT0s containing program information covering a first broadcast time, and a series of EIT1s with a second transmission interval, the series of EIT1s containing program information covering a second broadcast time after the first broadcast time, wherein the first transmission interval for the series of EIT0s is set narrower than the second transmission interval for the series of EIT1s;

parsing for the series of EIT0s and the series of EIT1s;

receiving a series of extended text tables ~~EIT3s~~ ETT3s containing program description associated with a series of EIT3s, wherein the transmission interval of the series of ~~EIT3s~~ ETT3s is greater than a sum of the first transmission interval of the series of EIT0s and the second transmission interval of the series of EIT1s; and parsing for the series of ~~EIT3s~~ ETT3s--.

UNITED STATES PATENT AND TRADEMARK OFFICE
CERTIFICATE OF CORRECTION

PATENT NO. : 7,428,745 B2
APPLICATION NO. : 11/075944
DATED : September 23, 2008
INVENTOR(S) : Mark T. Corl It is certified that error appears in the above-identified patent and that said Letters Patent is hereby corrected as shown below:

Col. 7, claim 21. should read --A method of operating a digital television (DTV) receiver that receives and processes a data stream in a broadcast environment, the method comprising:

receiving a group of EIT0s with a first transmission interval, the group of EIT0s containing program information covering a first broadcast time;

parsing for the group of EIT0s;

receiving a group of EIT1s with a second transmission interval, the group of EIT1s containing program information covering a second broadcast time after the first broadcast time, wherein the first transmission interval for the group of EIT0s is set narrower than the second transmission interval for the group of EIT1s;

parsing for the group of EIT1s;

receiving a group of extended text tables ~~EIT3s~~ ETT3s containing program description associated with a group of EIT3s, wherein the transmission interval of the group of ETT3s is greater than a sum of the first transmission interval of the group of EIT0s and the second transmission interval of the group EIT1s; and parsing for the group of ~~EIT3s~~ ETT3s--.

Signed and Sealed this

Sixteenth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,428,745 B2
APPLICATION NO. : 11/075944
DATED : September 23, 2008
INVENTOR(S) : Mark T. Corl It is certified that error appears in the above-identified patent and that said Letters Patent is hereby corrected as shown below:

Col. 7, claim 15, lines 18-37. should read --A method of operating a digital television (DTV) receiver that receives and processes a data stream in a broadcast environment, the method comprising:

receiving a series of EIT0s with a first transmission interval, the series of EIT0s containing program information covering a first broadcast time, and a series of EIT1s with a second transmission interval, the series of EIT1s containing program information covering a second broadcast time after the first broadcast time, wherein the first transmission interval for the series of EIT0s is set narrower than the second transmission interval for the series of EIT1s;

parsing for the series of EIT0s and the series of EIT1s;

receiving a series of extended text tables ~~EIT3s~~ ETT3s containing program description associated with a series of EIT3s, wherein the transmission interval of the series of ~~EIT3s~~ ETT3s is greater than a sum of the first transmission interval of the series of EIT0s and the second transmission interval of the series of EIT1s; and parsing for the series of ~~EIT3s~~ ETT3s--.

UNITED STATES PATENT AND TRADEMARK OFFICE
CERTIFICATE OF CORRECTION

PATENT NO. : 7,428,745 B2
APPLICATION NO. : 11/075944
DATED : September 23, 2008
INVENTOR(S) : Mark T. Corl It is certified that error appears in the above-identified patent and that said Letters Patent is hereby corrected as shown below:

Col. 7, claim 21, line 54 thru Column 8, line 8. should read --A method of operating a digital television (DTV) receiver that receives and processes a data stream in a broadcast environment, the method comprising:

receiving a group of EIT0s with a first transmission interval, the group of EIT0s containing program information covering a first broadcast time;

parsing for the group of EIT0s;

receiving a group of EIT1s with a second transmission interval, the group of EIT1s containing program information covering a second broadcast time after the first broadcast time, wherein the first transmission interval for the group of EIT0s is set narrower than the second transmission interval for the group of EIT1s;

parsing for the group of EIT1s;

receiving a group of extended text tables ~~EIT3s~~ ETT3s containing program description associated with a group of EIT3s, wherein the transmission interval of the group of ETT3s is greater than a sum of the first transmission interval of the group of EIT0s and the second transmission interval of the group EIT1s; and parsing for the group of ~~EIT3s~~ ETT3s--.

This certificate supersedes the Certificate of Correction issued December 16, 2008.

Signed and Sealed this

Twentieth Day of January, 2009

JON W. DUDAS
*Director of the United States Patent and Trademark Office*